Patented Apr. 26, 1927.

1,625,927

UNITED STATES PATENT OFFICE.

JOHN C. WOODRUFF AND GROVER BLOOMFIELD, OF TERRE HAUTE, INDIANA, ASSIGNORS TO COMMERCIAL SOLVENTS CORPORATION, OF TERRE HAUTE, INDIANA, A CORPORATION OF MARYLAND.

CATALYST FOR SYNTHETIC-METHANOL PRODUCTION.

No Drawing. Original application filed May 26, 1926, Serial No. 111,884. Divided and this application filed October 14, 1926. Serial No. 141,665.

Our invention relates to the production of methanol by the high pressure catalytic combination of oxides of carbon and hydrogen, and pertains more directly to the preparation and employment of improved catalysts containing cobalt in the process.

Methanol may be produced by combining oxides of carbon with hydrogen in the presence of a suitable catalyst at elevated temperature and pressure. Carbon monoxide, carbon dioxide, and mixtures of the two oxides may be employed, these substances reacting with hydrogen according to the following equations:—

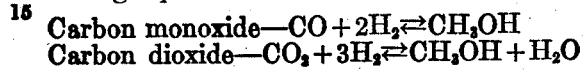

Carbon monoxide—$CO + 2H_2 \rightleftarrows CH_3OH$
Carbon dioxide—$CO_2 + 3H_2 \rightleftarrows CH_3OH + H_2O$ It is observed that when carbon dioxide is the oxide employed, one molecule of water is formed for every molecule of methanol produced. On the other hand when pure carbon monoxide is used, theoretically there is nothing produced by the reaction but methanol. Actually in practice pure carbon monoxide and pure carbon dioxide are both difficult to obtain economically, so that the methanol synthesis is carried out by reacting a mixture of carbon monoxide and carbon dioxide with hydrogen.

In addition to the reactions producing methanol there are, in the methanol synthesis, undesirable side-reactions which cut down the yield of the desired product. The principal side reaction which may occur is the formation of methane, which is illustrated below:

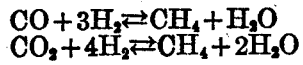

$$CO + 3H_2 \rightleftarrows CH_4 + H_2O$$
$$CO_2 + 4H_2 \rightleftarrows CH_4 + 2H_2O$$

In addition to the methane side-reaction there are other side reactions which sometimes occur in which there are produced esters, aldehydes, organic acids, ketones, and hydrocarbons other than methane; these reactions occurring as the result of the polymerization or condensation of methanol or its decomposition products.

When a gas mixture comprising carbon oxides mixed with an excess of hydrogen over the amount theoretically required to produce methanol is passed over a catalytic substance comprising metals or their oxides at a pressure above 50 atmospheres and at a temperature above 250° C. there is nearly always produced some reaction between the gaseous components. The extent of this reaction depends to some degree on space velocity, temperature, and pressure, but the fact remains that under the conditions outlined, carbon oxides and hydrogen react to some extent in all cases.

The substances formed by such a process depend both as to identity and as to amount, almost entirely on the nature and activity of the catalytic substance present. The methanol catalysts proposed in the past have been of two principal types:—i. e.—

1. Mixtures of finely divided metals, or, what is equivalent, mixtures of easily reducible metal oxides;

2. Mixtures of oxides of metals non-reducible, or difficulty reducible under the conditions of the methanol synthesis.

In the past, also, one class of easily reducible metal oxides, that is the oxides of iron, nickel, and cobalt have been described as absolutely worthless for the production of methanol catalysts since these metals under normal conditions prevent the formation of methanol, the reaction producing only methane.

We have discovered a new type of methanol catalyst which produces a higher yield of methanol than those formerly employed in the art, and at the same time produces a very pure methanol, uncontaminated by by-products. An additional advantage accruing from the use of our catalysts is that the formation of methane in the process—with the consequent destruction of valuable hydrogen—is practically eliminated.

We have now discovered a new type of valuable methanol catalyst which comprises three main elements—i. e.

(1) One or more non-reducible metal oxides such as zinc, magnesium, cadmium, chromium, vanadium, tungsten, etc.;

(2) One or more easily reducible metal oxides such as copper, silver, iron, nickel, cobalt, etc.;

(3) A metallic halide.

It will be observed that in our improved catalyst we may employ substances normally deleterious to the methanol reaction—namely the "methanating metals"—iron, nickel, or cobalt. In our improved catalyst compositions these normally deleterious substances serve advantageously, apparently exerting only a normal hydrogenating catalytic action productive of methanol. Or we may employ easily reducible oxides such as those of copper or silver which are already known in the art as advantageous components of certain methanol catalysts. In these cases however, our improved catalysts containing halides produce far better results than those known in the art for otherwise identical catalyst mixtures.

The precise method by which the metallic halides produce the improvement is not known to us. At least three theories may be used to account for the phenomenon—namely:—

(1) The metallic halide acts as an ordinary "promoter" in increasing catalyst activity;

(2) The metallic halide interacts with other metallic oxides present in the catalyst to produce oxychloride compounds which, in turn, either serve as catalyst promoters, or may so modify the purely physical state of the mass as to produce a more active catalyst;

(3) The metallic halide may be reduced by the high pressure contact with hydrogen and carbon oxides during the commencement of its use as a catalyst and the resultant finely divided metal may increase the catalyst activity, or alternatively, the metallic halide may first react with some other metal producing the halide thereof, which may be reduced in the same manner.

However, the precise explanation for the improved result attained by the addition of metallic halides to methanol catalysts is not known and forms no part of our invention.

To produce our improved catalysts it is not necessary that the amount of metallic halide added bear any exact weight relation to the remaining constituents of the catalyst, though the amount of halide added should preferably be less than one chemical equivalent of the amount of principal metallic oxide present in the catalyst.

As illustrative of our invention we will cite two specific catalysts containing cobalt. In order to indicate the comparative efficacy of these catalysts in methanol production we have selected a standard set of conditions of use as follows. The reported yields of condensate from the methanol reaction by use of the following catalysts is based on the effect produced when a gas mixture comprising 8% carbon dioxide, 3% of carbon monoxide and 89% hydrogen is passed through 1 liter of catalyst granules at a space velocity of 75,000–100,000, at a pressure of 2000 pounds, and at a temperature of 340–400° C.

In selecting a standard set of conditions it is our intention only to thus display the catalyst efficacy and by no means to limit the scope of our invention. Modification of the conditions of the reaction will, of course, modify the results, but the results will always be proportionate to the catalyst employed.

For example, an increased space velocity produces an increased hourly yield and an increase in operating pressure has the same effect. Likewise the use of pure carbon monoxide as distinguished from carbon dioxide or a mixture of the two results in an increased methanol percentage in the condensate, and, since carbon monoxide seems to react more readily, an increased condensate volume.

*Example I.*

2250 grams of cobalt nitrate $(Co(NO_3)_2 \cdot 6H_2O)$ are dissolved in 250 liters of water and the solution is heated to 95° C. There is then added 7.5 kilograms of zinc oxide after which the solution is vigorously stirred and sufficient ammonium hydroxide is added to precipitate the cobalt as cobalt hydrate. The precipitated mass is recovered by decantation and filtration, is washed, dried, and broken up into granules. The granules are then moistened with a solution containing 1480 grams zinc chloride and dried once more.

The hourly yield of condensate is about 1.5 liters and contains about 58% of methanol.

*Example II.*

If the zinc chloride in Example I is replaced by 1300 grams of magnesium bromide the hourly yield of condensate and percentage yield of methanol is not greatly modified.

This application is a division of our co-pending application Serial No. 111,884, filed May 26th, 1926. In the said application we have claimed, generically, methanol catalysts comprising difficultly reducible metal oxides, easily reducible metal oxides, and metallic halides and therefore such generic claims are not made herein.

Now having described our invention, we claim the following as new and novel.

1. A methanol catalyst initially comprising a plurality of difficultly reducible metal oxides, cobalt oxide, and a metallic halide.

2. A methanol catalyst initially comprising a difficultly reducible metal oxide, cobalt oxide, and a metallic halide.

3. A methanol catalyst initially comprising zinc oxide, chromium oxide, cobalt oxide, and a metallic halide.

4. A methanol catalyst initially comprising zinc oxide, cobalt oxide, and a metallic halide.

5. A methanol catalyst initially comprising zinc oxide, chromium oxide, cobalt oxide, and zinc chloride.

6. A methanol catalyst initially comprising zinc oxide, cobalt oxide, and zinc chloride.

7. A process for the production of synthetic methanol which comprises passing a mixture of hydrogen and carbon oxides at a pressure in excess of 50 atmospheres and at a temperature of 350–450° C. over a catalyst initially comprising a plurality of difficultly reducible metal oxides, cobalt oxide, and a metallic halide.

8. A process for the production of synthetic methanol which comprises passing a mixture of hydrogen and carbon oxides at a pressure in excess of 50 atmospheres, and at a temperature of 350–450° C. over a catalyst initially comprising a difficultly reducible metal oxide, cobalt oxide and a metallic halide.

9. A process for the production of synthetic methanol which comprises passing a mixture of hydrogen and carbon oxides at a pressure in excess of 50 atmospheres, and at a temperature of 350–450° C. over a catalyst initially comprising zinc oxide, chromium oxide, cobalt oxide, and zinc chloride.

In testimony whereof we affix our signatures.

JOHN C. WOODRUFF.
GROVER BLOOMFIELD.